US010599364B2

(12) United States Patent
Chen

(10) Patent No.: US 10,599,364 B2
(45) Date of Patent: Mar. 24, 2020

(54) COMMAND PROCESSING METHOD AND STORAGE CONTROLLER

(71) Applicant: Shenzhen EpoStar Electronics Limited CO., Shenzhen (CN)

(72) Inventor: Tsan-Lin Chen, Hsinchu County (TW)

(73) Assignee: Shenzhen EpoStar Electronics Limited CO., Shenzhen (CN)

( * ) Notice: Subject to any disclaimer, the term of this patent is extended or adjusted under 35 U.S.C. 154(b) by 28 days.

(21) Appl. No.: 16/046,994

(22) Filed: Jul. 26, 2018

(65) Prior Publication Data

US 2019/0377515 A1 Dec. 12, 2019

(30) Foreign Application Priority Data

Jun. 8, 2018 (TW) ............................ 107119934 A

(51) Int. Cl.
*G06F 3/06* (2006.01)

(52) U.S. Cl.
CPC .......... *G06F 3/0659* (2013.01); *G06F 3/0604* (2013.01); *G06F 3/0656* (2013.01); *G06F 3/0673* (2013.01)

(58) Field of Classification Search
CPC combination set(s) only.
See application file for complete search history.

(56) References Cited

U.S. PATENT DOCUMENTS 6,239,810 B1 5/2001 Van Hook et al.
6,810,042 B1 * 10/2004 Naumann .............. H04L 49/90 370/412
8,681,861 B2 3/2014 Garg et al.
2011/0138092 A1 6/2011 Morimoto et al.
2014/0068133 A1 * 3/2014 Tkacik ............... G06F 13/1694 710/308
2014/0172788 A1 6/2014 Haase et al.
2018/0018118 A1 * 1/2018 Raghava ................ G06F 1/324

OTHER PUBLICATIONS

"Office Action of Taiwan Counterpart Application," dated Apr. 26, 2019, p. 1-p. 4.

* cited by examiner

*Primary Examiner* — Yong J Choe
(74) *Attorney, Agent, or Firm* — JCIPRNET

(57) ABSTRACT

A command processing method and a storage controller are provided. The command processing method is adapted for the storage controller. The storage controller includes a processor and peripherals. The command processing method includes: disposing a first command buffer and a second command buffer in the processor; disposing a synchronizer in the storage controller, the synchronizer changing a value of a flag at a predetermined interval to set the first command buffer or the second command buffer valid; and when the first command buffer is valid and the processor issues a command, the processor temporarily stores the command in the first command buffer and one of the peripherals accesses the command in the first command buffer to executes a corresponding operation.

10 Claims, 4 Drawing Sheets

COMMAND PROCESSING METHOD AND STORAGE CONTROLLER

CROSS-REFERENCE TO RELATED APPLICATION

This application claims the priority benefit of Taiwan application serial no. 107119934, filed on Jun. 8, 2018. The entirety of the above-mentioned patent application is hereby incorporated by reference herein and made a part of this specification.

BACKGROUND OF THE INVENTION

1. Field of the Invention

The disclosure relates to a command processing method and a storage controller, and more particularly to a command processing method and a storage controller capable of improving an execution speed of a command.

2. Description of Related Art

FIG. 1 is a well-known block diagram of a storage controller. In FIG. 1, a storage controller 100 has a processor 110, a system bus 120, a command buffer 130 and peripherals 140(1) to 140(N). When the processor 110 issues a command, the command is transmitted to the command buffer 130 using a command path 101 and is stored in the command buffer 130 temporarily. The peripherals 140(1) to 140(N) may access the command in the command buffer 130 through the system bus 120 and perform the command. However, since all the components of the storage controller 100 are attached to the system bus 120, a considerable amount of latency would be generated on the bus. The latency of the bus would severely affect the throughput of the processor. Consequently, how to reduce the latency of the bus of the storage controller 100 is a goal to be strived for those skilled in the art.

SUMMARY OF THE INVENTION

Given the above, the disclosure provides a command processing method and a storage controller capable of reducing latency of a bus effectively and improving an execution speed of a command.

The disclosure provides a command processing method that is adapted for a storage controller. The storage controller includes a processor and a plurality of peripherals. The processor is coupled to the peripherals through a system bus. The command processing method in one of exemplary embodiments is provided hereafter. A first command buffer and a second command buffer are disposed in the processor. The first command buffer and the second command buffer are coupled to a processor core of the processor through a local bus of the processor, and latency of the local bus is lower than latency of the system bus. A synchronizer is disposed in the storage controller, wherein the synchronizer is coupled to the processor and the peripherals and changes a value of a flag at a predetermined interval to set the first command buffer or the second command buffer valid. When the first command buffer is valid and the processor issues a command, the processor stores the command in the first command buffer temporarily and one of the peripherals accesses the command in the first command buffer to perform a corresponding operation.

In an embodiment of the disclosure, the processor and the peripherals receive the flag at each of the predetermined interval.

In an embodiment of the disclosure, when a value of the flag is a first value, the first command buffer is valid and the second command buffer is invalid; when a value of the flag is a second value, the second command buffer is valid and the first command buffer is invalid.

In an embodiment of the disclosure, when the first command buffer is valid and a dummy command corresponding to the command is transmitted to the second command buffer, the peripherals do not access the dummy command.

In an embodiment of the disclosure, the dummy command is a temporary data generated during a process when the processor core calculates the command.

In an embodiment of the disclosure, when the first command buffer is valid and a dummy command corresponding to the command is transmitted to the first command buffer, the peripherals do not access the dummy command and instead access the command only after the dummy command is overwritten by the command.

The disclosure provides a storage controller. The storage controller includes a processor and a plurality of peripherals. The processor is coupled to the peripherals through a system bus. A first command buffer and a second command buffer are disposed in the processor and are coupled to a processor core of the processor through a local bus of the processor. Latency of the local bus is lower than latency of the system bus. A synchronizer is disposed in the storage controller, is coupled to the processor and the peripherals and changes a value of a flag at a predetermined interval to set the first command buffer or the second command buffer valid. When the first command buffer is valid and the processor issues a command, the processor stores the command in the first command buffer temporarily and one of the peripherals accesses the command in the first command buffer to perform a corresponding operation.

In an embodiment of the disclosure, the processor and the peripherals receive a flag at each of the predetermined interval.

In an embodiment of the disclosure, when a value of the flag is a first value, the first command buffer is valid, while the second command buffer is invalid; when a value of the flag is a second value, the second command buffer is valid, while the first command buffer is invalid.

In an embodiment of the disclosure, when the first command buffer is valid and a dummy command corresponding to the command is transmitted to the second command buffer, the peripherals do not access the dummy command.

In an embodiment of the disclosure, the dummy command is a temporary data generated during a process when the processor core calculates the command.

In an embodiment of the disclosure, when the first command buffer is valid and a dummy command corresponding to the command is transmitted to the first command buffer, the peripherals do not access the dummy command and instead access the command only after the dummy command is overwritten by the command.

In view of the foregoing, in the command processing method and the storage method according to the embodiments of the disclosure, the first command buffer and the second command buffer are disposed in the processor, and only one command buffer is valid at the same time point. When the dummy command corresponding to a command is transmitted to the invalid command buffer, the peripherals do not access the dummy command in the invalid command buffer. When the dummy command corresponding to a command is transmitted to the valid command buffer, the dummy command is overwritten by the command before the peripherals access the dummy command in the valid command buffer as latency of the local bus is lower than latency of the system bus. In this manner, the peripherals access the correct command rather than the dummy command.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
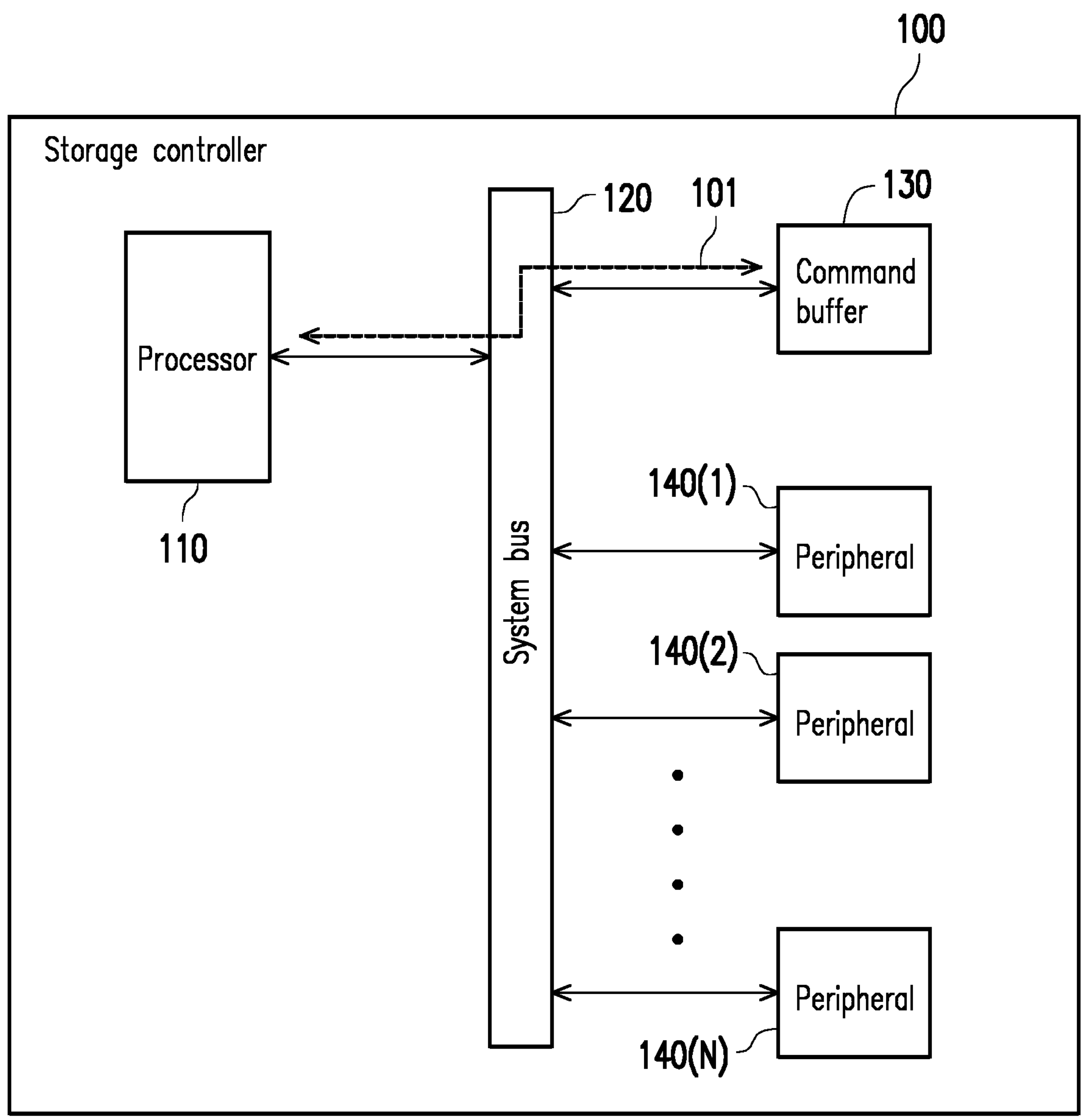
FIG. 1 is a well-known block diagram of a storage controller.

Reference will now be made in detail to the present preferred embodiments of the invention, examples of which are illustrated in the accompanying drawings. Wherever possible, the same reference numbers are used in the drawings and the description to refer to the same or like parts.

Figure 2:
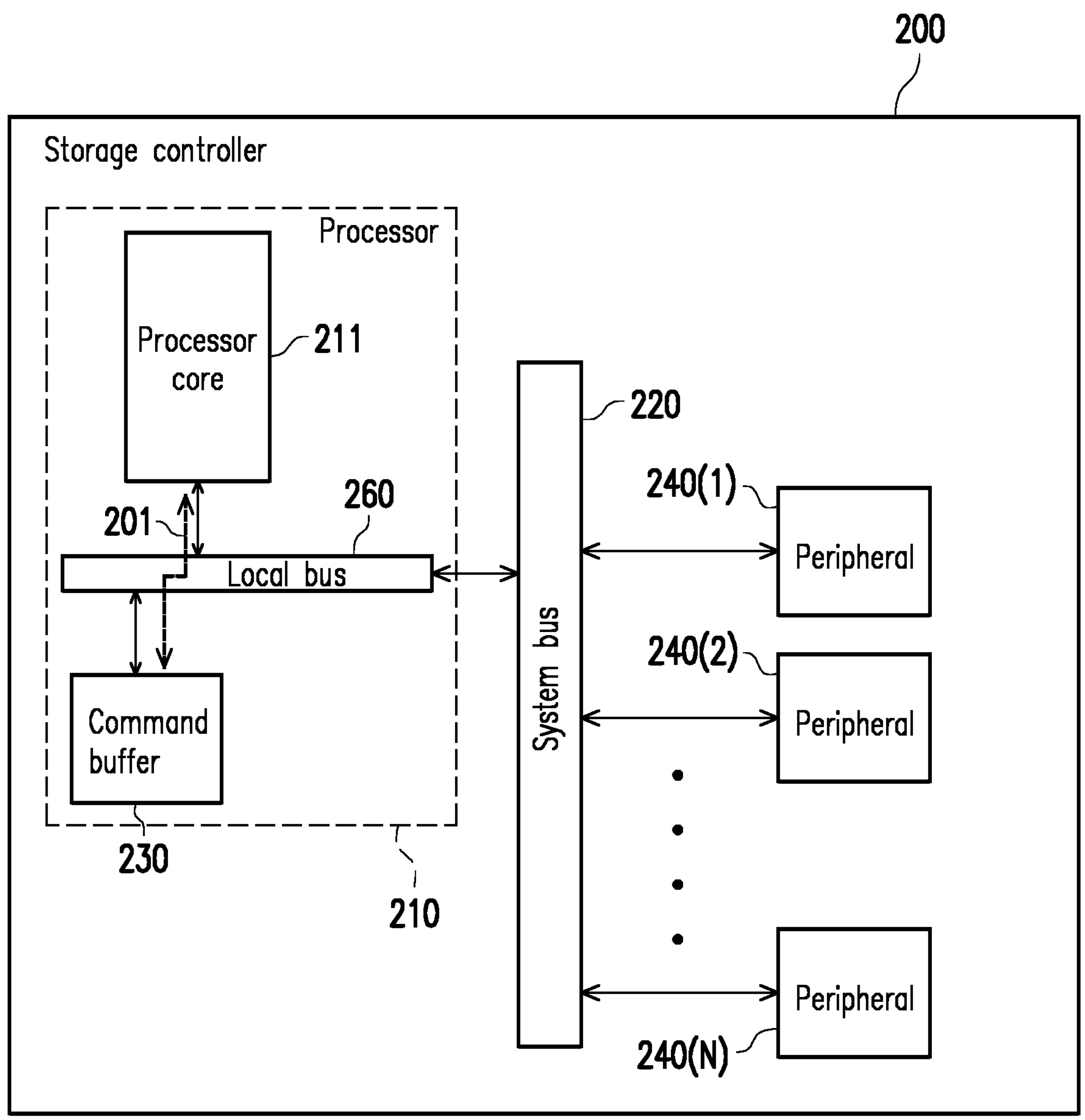
FIG. 2 is a block diagram of a storage controller according to an embodiment of the disclosure.

FIG. 2 is a block diagram of a storage controller according to an embodiment of the disclosure.

Referring to FIG. 2, a storage controller 200 according to an embodiment of the disclosure includes a processor 210 and peripherals 240(1) to 240(N). The processor 210 is coupled to the peripherals 240(1) to 240(N) through a system bus 220 and includes a processor core 211 and a command buffer 230. The processor core 211 is coupled to the command buffer 230 through a local bus 260. When the processor core 211 issues a command, the command is transmitted to the command buffer 230 in a command path 201. The command buffer 230 may be, for example, a static random access memory (SRAM), a cache memory or other similar components. The peripherals 240(1) to 240(N) access the command from the command buffer 230 and perform the command. Since latency of the local bus 260 is lower than latency of the system bus 220, latency in the command path 201 in the embodiment may be minimized to enhance a speed of performing the command.

The storage controller 200 may be coupled to a host system (not shown) and a rewritable non-volatile memory module (not shown). The storage controller 220 may receive the command from the host system to access the rewritable non-volatile memory module.

Figure 3:
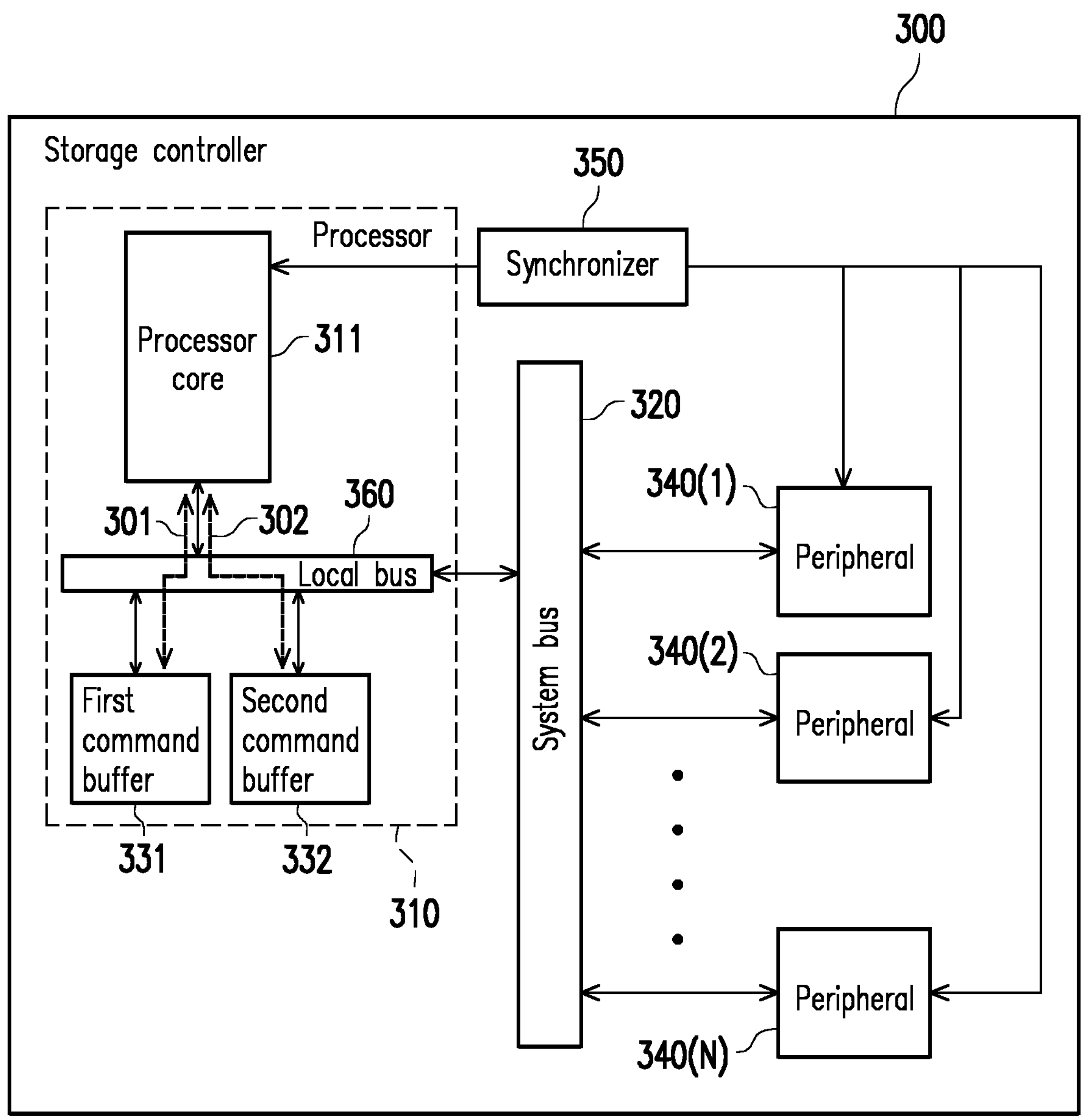
FIG. 3 is a block diagram of a storage controller according to another embodiment of the disclosure.

FIG. 3 is a block diagram of a storage controller according to another embodiment of the disclosure.

Referring to FIG. 3, a storage controller 300 according to an embodiment of the disclosure includes a processor 310 and peripherals 340(1) to 340(N). The processor 310 is coupled to the peripherals 340(1) to 340(N) through a system bus 320. The processor 310 includes a processor core 311, a first command buffer 331 and a second command buffer 332. The processor core 311 is coupled to a first command buffer 331 and a second command buffer 332 through a local bus 360. When the processor core 311 issues a command, the command is transmitted to the first command buffer 331 and the second command buffer 332 in a first command path 301 and a second command path 302 respectively. The first command buffer 331 and the second command buffer 332 are, for example, static ram access memories (SRAM), cache memories or other similar components. The peripherals 340(1) to 340(N) access the command from the first command buffer 331 and the second command buffer 332 and perform the command. The first command buffer 331 and the second command buffer 332 may be two different physical memories or different memory address segments in a physical memory.

The storage controller 300 may be coupled to the host system (not shown) and the rewritable non-volatile memory module (not shown) and receive the command from the host system to access the rewritable non-volatile memory module.

In the embodiment, the storage controller 300 further includes a synchronizer 350. The synchronizer 350 is coupled to the processor core 311 and the peripherals 340(1) to 340(N) and provides a flag for the processor core 311 and the peripherals 340(1) to 340(N). A value of the flag changes at a predetermined interval. The predetermined interval may be milliseconds or microseconds, but the embodiment of the disclosure is not limited thereto. For example, the value of the flag oscillates between 0 and 1 at each interval. When the value of the flag is 0, the first command buffer 331 is valid, while the second command buffer 332 is invalid; when the value of the flag is 1, the first command buffer 331 is invalid, while the second command buffer 332 is valid. The processor core 331 issues a command to a valid command buffer, and the peripherals 340(1) to 340(N) also access the command from the valid command buffer to perform a corresponding operation.

When the processor core 311 is in a process of calculating a command, a plurality of temporary data or variables (also called "dummy commands") are generated, and the dummy commands are required to be stored in the command buffer temporarily. The processor core 311 cannot control which command buffer to temporarily store the dummy command. In other words, even if the processor core 311 may temporarily store the command in the valid command buffer, the processor core 311 is still likely to temporarily store the dummy command in the invalid command buffer.

When the first command buffer 331 is valid and the dummy command corresponding to a command is transmitted to the second command buffer 332, the peripherals 340(1) to 340(N) do not access the dummy command. The reason is that the peripherals 340(1) to 340(N) learn based on a flag sent by the synchronizer 350 that the second command buffer 332 is invalid at this time point, and therefore does not access the dummy command in the second command buffer 332.

When the first command buffer 331 is valid and the dummy command corresponding to a command is transmitted to the first command buffer 331, the peripherals 340(1) to 340(N) do not access the dummy command and instead access the command only after the dummy command is overwritten by the command. More specifically, since latency of the local bus 360 is lower than latency of the system bus 320, the dummy command, after written into the first command buffer 331, is overwritten by the command immediately. Therefore, when the dummy command is written into the first command buffer 331 and the peripherals 340(1) to 340(N) know that a command is present in the first command buffer 331, the peripherals 340(1) to 340(N) only access the command that is overwritten at an address of the dummy command from the first command buffer 331.

In the embodiment, the processor 310 includes the local bus 360, the first command buffer 331 and the second command buffer 332. With a configuration that only one command buffer is valid at the same time point, the peripherals 340(1) to 340(N) do not access the dummy command that should not be accessed to cause system errors. Meanwhile, the local system 360 may further be used to enhance a speed of accessing and performing a command to increase the throughput of a system.

Figure 4:
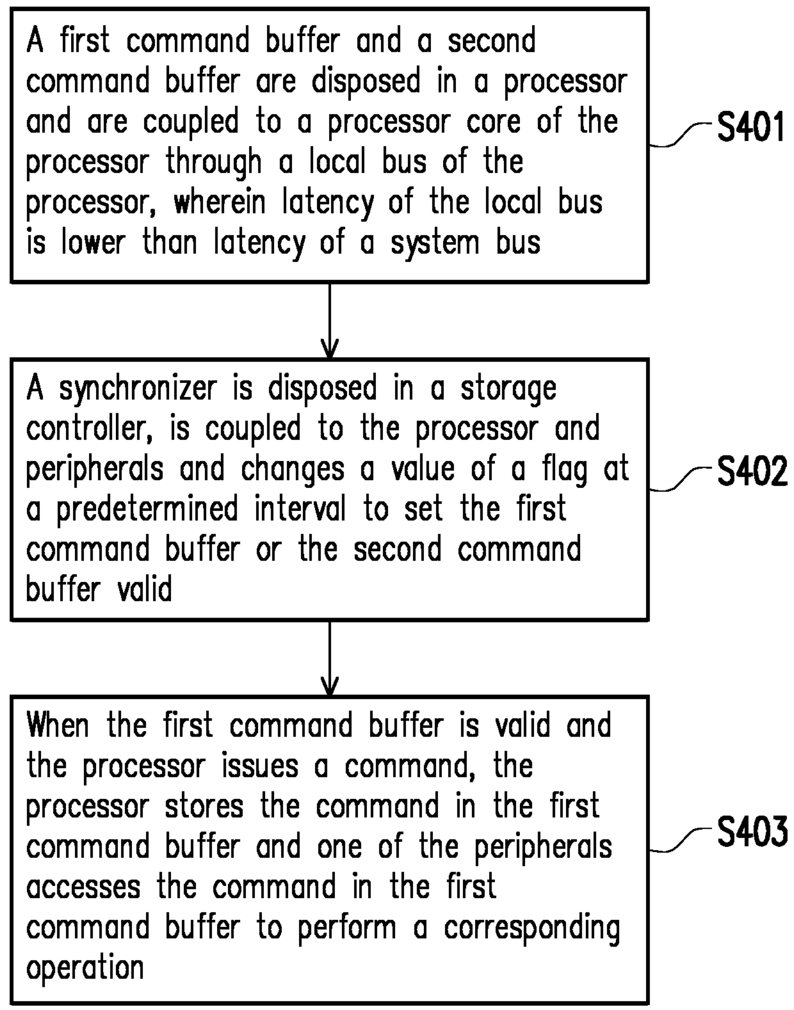
FIG. 4 is a flowchart of a command processing method according to an embodiment of the disclosure.

FIG. 4 is a flowchart of a command processing method according to an embodiment of the disclosure.

Referring to FIG. 4, at step S401, the first command buffer 331 and the second command buffer 332 are disposed in the processor 310 and are coupled to the processor core 311 of the processor 310 through the local bus 360 of the processor 310, and latency of the local bus 360 is lower than latency of the system bus 320.

At step S402, the synchronizer 350 is disposed in the storage controller 300, is coupled to the processor 310 and the peripherals 340(1) to 340(N), and change the value of the flag at the predetermined interval to set the first command buffer 331 or the second command buffer 332 valid.

At step S403, when the first command buffer 331 is valid and the processor 310 issues a command, the processor 310 stores the command temporarily in the first command buffer 331 and one of the peripherals 340(1) to 340(N) accesses the command in the first command buffer 331 to perform a corresponding operation.

In view of the foregoing, in the command processing method and the storage controller according to the embodiments of the disclosure, the first command buffer and the second command buffer are disposed in the processor, and only one command buffer is valid at the same time point. When the dummy command corresponding to a command is transmitted to the invalid command buffer, the peripherals do not access the dummy command in the invalid command buffer; when the dummy command corresponding to a command is transmitted to the valid command buffer, the dummy command is overwritten by the command before the peripherals access the dummy command in the valid command buffer as latency of the local bus is lower than latency of the system bus. In this way, the peripherals access the correct command rather than the dummy command. Therefore, the command processing method and the storage controller according to the embodiments of the disclosure may reduce latency of the bus effectively and improve the execution speed of the command.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A command processing method, adapted for a storage controller, the storage controller including a processor and a plurality of peripherals, the processor coupled to the peripherals through a system bus, the command processing method comprising:

disposing a first command buffer and a second command buffer in the processor, the first command buffer and the second command buffer coupled to a processor core of the processor through a local bus of the processor, wherein latency of the local bus is lower than latency of the system bus;

disposing a synchronizer in the storage controller, the synchronizer coupled to the processor and the peripherals and changing a value of a flag at a predetermined interval to set the first command buffer or the second command buffer valid; and when the first command buffer is valid and the processor issues a command, the processor stores the command in the first command buffer temporarily and one of the peripherals accesses the command in the first command buffer to perform a corresponding operation, wherein when a value of the flag is a first value, the first command buffer is valid, while the second command buffer is invalid; when a value of the flag is a second value, the second command buffer is valid, while the first command buffer is invalid.

2. The command processing method according to claim 1, wherein the processor and the peripherals receive the flag at each of the predetermined interval.

3. The command processing method according to claim 1, wherein when the first command buffer is valid and a dummy command corresponding to the command is transmitted to the second command buffer, the peripherals do not access the dummy command.

4. The command processing method according to claim 3, wherein the dummy command is a temporary data generated in a process when the processor core calculates the command.

5. The command processing method according to claim 1, wherein when the first command buffer s valid and a dummy command corresponding to the command is transmitted to the first command buffer, the peripherals do not access the dummy command and instead access the command only after the dummy command is overwritten by the command.

6. A storage controller, comprising:

a processor; and a plurality of peripherals, the processor coupled to the peripherals through a system bus, wherein a first command buffer and a second command buffer are disposed in the processor and are coupled to a processor core of the processor through a local bus of the processor, wherein latency of the local bus is lower than latency of the system bus;

a synchronizer is disposed in the storage controller, the synchronizer coupled to the processor and the peripherals and changing a value of a flag at a predetermined interval to set the first command buffer or the second command buffer valid; and when the first command buffer is valid and the processor issues a command, the processor stores the command in the first command buffer temporarily and one of the peripherals accesses the command in the first command buffer to perform a corresponding operation, wherein when a value of the flag is a first value, the first command buffer is valid, while the second command buffer is invalid; when a value of the flag is a second value, the second command buffer is valid, while the first command buffer is invalid.

7. The storage controller according to claim 6, wherein the processor and the peripherals receive the flag at each of the predetermined interval.

8. The storage controller according to claim 6, wherein when the first command buffer is valid and a dummy command corresponding to the command is transmitted to the second command buffer, the peripherals do not access the dummy command.

9. The storage controller according to claim 6, wherein the dummy command is a temporary data generated in a process when the processor core calculates the command.

10. The storage controller according to claim 6, wherein when the first command buffer is valid and a dummy command corresponding to the command is transmitted to the first command buffer, the peripherals do not access the dummy command and instead access the command only after the dummy command is overwritten by the command.

* * * * *